United States Patent
Wang et al.

(10) Patent No.: US 12,401,781 B2
(45) Date of Patent: Aug. 26, 2025

(54) ROW DRIVER ASSEMBLY AND SOLID-STATE IMAGING DEVICE

(71) Applicant: Sony Semiconductor Solutions Corporation, Atsugi (JP)

(72) Inventors: Tongxi Wang, Stuttgart (DE); Manuel Moreno-Garcia, Stuttgart (DE); Naoki Kawazu, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/283,454

(22) PCT Filed: Mar. 18, 2022

(86) PCT No.: PCT/EP2022/057197
§ 371 (c)(1),
(2) Date: Sep. 22, 2023

(87) PCT Pub. No.: WO2022/207368
PCT Pub. Date: Oct. 6, 2022

(65) Prior Publication Data
US 2024/0155103 A1    May 9, 2024

(30) Foreign Application Priority Data
Mar. 31, 2021 (EP) .................................... 21166131

(51) Int. Cl.
*H04N 17/00* (2006.01)
*H04N 25/57* (2023.01)
(Continued)

(52) U.S. Cl.
CPC ........... *H04N 17/002* (2013.01); *H04N 25/57* (2023.01); *H04N 25/779* (2023.01); *H04N 25/7795* (2023.01); *H04N 25/78* (2023.01)

(58) Field of Classification Search
CPC .... H04N 17/002; H04N 25/57; H04N 25/779; H04N 25/78; H04N 25/69; H04N 25/709; H04N 25/7795; H04N 25/76
See application file for complete search history.

(56) References Cited

U.S. PATENT DOCUMENTS

2012/0228476 A1* 9/2012 Muroshima ....... H01L 27/14609
                                                               250/208.1
2014/0132814 A1    5/2014 Ishii et al.
(Continued)

FOREIGN PATENT DOCUMENTS

EP    2280536 A1    2/2011
WO    2019/171839 A1    9/2019

OTHER PUBLICATIONS

International Search Report and Written Opinion mailed on Jun. 10, 2022, received for PCT Application PCT/EP2022/057197, filed on Mar. 18, 2022, 9 pages.

*Primary Examiner* — Michael E Teitelbaum
(74) *Attorney, Agent, or Firm* — XSENSUS LLP

(57) ABSTRACT

A row driver assembly includes a row driver unit. The row driver unit includes a buffer circuit that drives a control signal to a pixel circuit. The buffer circuit is electrically connected to a high buffer supply voltage and to a low buffer supply voltage. A voltage converter circuit supplies the low buffer supply voltage to the buffer circuit. An error detection circuit outputs an active error signal when the low buffer supply voltage is outside a target voltage window.

12 Claims, 14 Drawing Sheets

(51) Int. Cl.
    *H04N 25/76*     (2023.01)
    *H04N 25/779*     (2023.01)
    *H04N 25/78*     (2023.01)

(56) References Cited

U.S. PATENT DOCUMENTS

| | | |
|---|---|---|
| 2015/0171749 A1 | 6/2015 | Gou et al. |
| 2019/0088199 A1 | 3/2019 | Zhang et al. |
| 2019/0139492 A1 | 5/2019 | Chen et al. |
| 2020/0211457 A1 | 7/2020 | Kim et al. |

\* cited by examiner

ROW DRIVER ASSEMBLY AND SOLID-STATE IMAGING DEVICE

CROSS-REFERENCE TO RELATED APPLICATIONS

The present application is based on PCT filing PCT/EP2022/057197, filed Mar. 18, 2022, and claims priority from European Patent Application No. 21166131.9, filed Mar. 31, 2021, the entire contents of each are incorporated herein by reference.

The present disclosure relates to a row driver assembly and to a solid-state imaging device. More specifically, the disclosure relates to row driver assemblies for CMOS image sensor assemblies.

BACKGROUND

Active image sensors in solid-state imaging devices include photoelectric conversion elements generating a photocurrent with a current rating in proportion to the received radiation intensity. A pixel circuit transforms the small photocurrent generated by the photoelectric conversion element into a comparatively large output voltage which a downstream analog-to-digital converter converts into a digital signal. The pixel circuit includes several transistors receiving control signals generated in a row decoder unit. A row driver assembly includes amplifier circuits that drive the control signals received from the row decoder unit and pass the amplified control signals to the pixel circuits. Row driver assemblies typically include a step-up/step-down circuit for generating supply voltages for the amplifier circuits.

SUMMARY

Today, there is an ongoing need for solid-state imaging devices with high quality, e.g. low pixel-to-pixel variations that cover a wide dynamic range for exposure radiation and facilitate fast image capturing. The present disclosure has been made in view of the above circumstances, and it is therefore desirable to provide a row driver unit and a solid-state imaging device facilitating analysis and assessment of the functionality of solid-stage imaging devices and image sensors.

In this regard, the present disclosure relates to a row driver assembly that includes a row driver unit. The row driver unit includes a buffer circuit that drives a control signal to a pixel circuit. The buffer circuit is electrically connected to a high buffer supply voltage and to a low buffer supply voltage. A voltage converter circuit supplies the low buffer supply voltage to the buffer circuit. An error detection circuit outputs an active error signal when the low buffer supply voltage is outside a target voltage window.

The present disclosure further relates to a solid-state imaging device. A pixel circuit includes a photoelectric conversion element and at least one pixel transistor. The row driver unit includes a buffer circuit that drives a gate signal for the at least one pixel transistor. The buffer circuit is electrically connected to a high buffer supply voltage and to a low buffer supply voltage. A voltage converter circuit supplies the low buffer supply voltage to the buffer circuit. An error detection circuit outputs an active error signal when the low buffer supply voltage is outside a target voltage window.

The described embodiments, together with further advantages, will be best understood by reference to the following detailed description taken in conjunction with the accompanying drawings.

DETAILED DESCRIPTION

Embodiments for implementing techniques of the present disclosure (also referred to as "embodiments" in the following) will be described below in detail using the drawings. The techniques of the present disclosure are not limited to the embodiments, and various numerical values and the like in the embodiments are illustrative. In the following description, the same elements or elements with the same functions are denoted by the same reference signs, and duplicate descriptions are omitted.

Electrically connected electronic elements may be electrically connected through a direct, permanent low-resistive connection, e.g., through a conductive line. The terms "electrically connected" and "signal connected" may also include a connection through other electronic elements provided and suitable for permanent and/or temporary signal transmission and/or transmission of energy. For example, electronic elements may also be electrically connected and signal connected through electronic switches such as transistor switches, transistors or transistor circuits, e.g. FETs (field effect transistors), FET circuits, transmission gates, and others.

The load path of a transistor is the controlled path of a transistor. For example, a voltage applied to a gate of an FET controls by field effect the current flow through the load path between source and drain.

Though in the following a technology for improving reliability of image sensor assemblies are described in the context of certain types of active image sensors for intensity read-out, the technology may also be used for other types of active image sensors, e.g. image sensors for event-based vision sensors.

Figure 1:
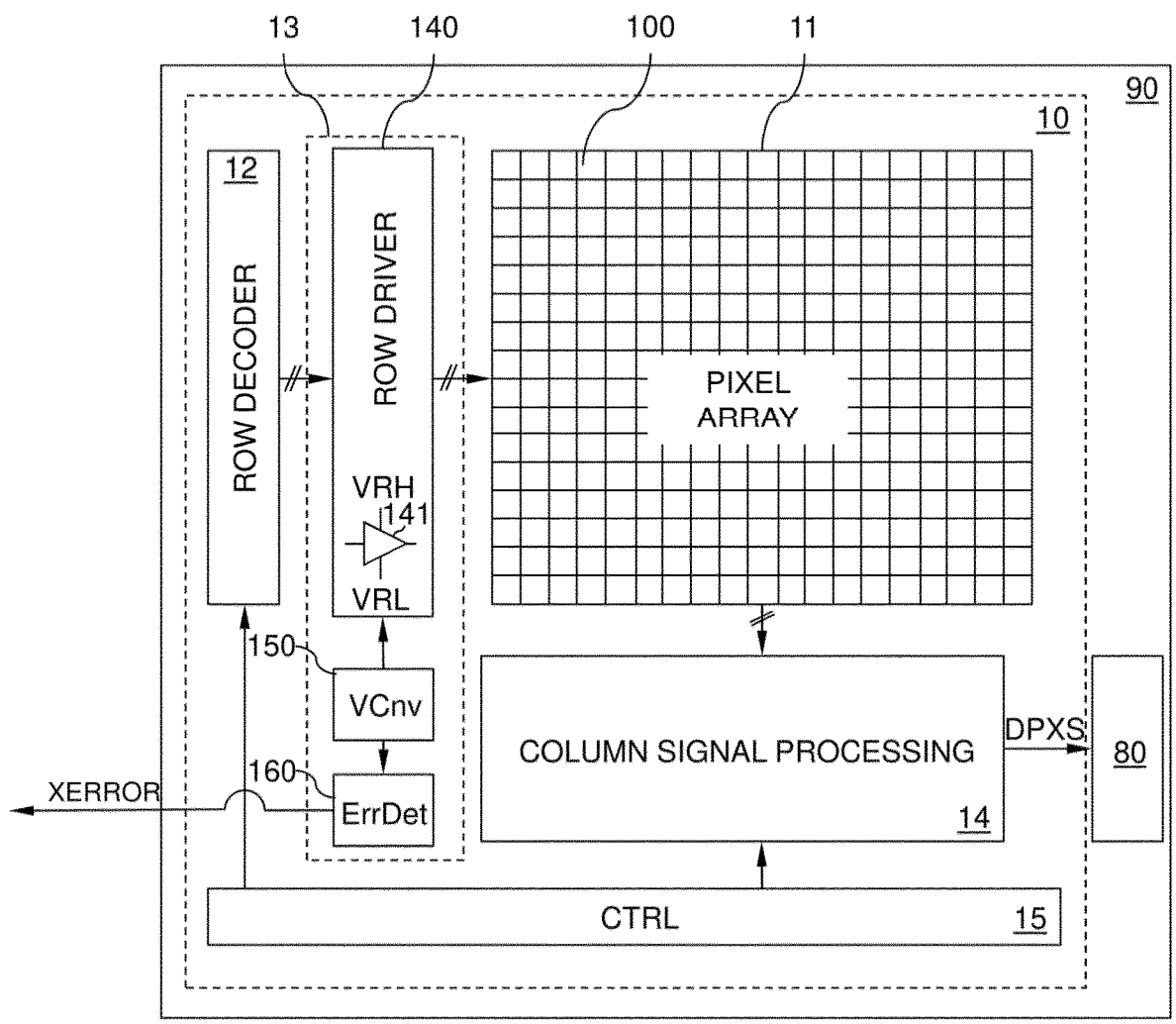
FIG. 1 is a simplified block diagram illustrating a configuration example of a solid-state imaging device with a row driver assembly according to an embodiment of the present technology.

FIG. 1 illustrates a configuration example of a solid-state imaging device 90 including an image sensor assembly 10 and a signal processing unit 80 according to an embodiment of the present technology.

The image sensor assembly 10 may include a pixel array unit 11, a row decoder 12, a row driver assembly 13, a column signal processing unit 14 with a readout circuit and a horizontal driving circuit, and a sensor controller 15.

The pixel array unit 11 includes a plurality of pixel circuits 100. Each pixel circuit 100 includes a photoelectric conversion element and a number of pixel transistors for controlling the signal output by the photoelectric conversion element. The pixel circuits 100 may be any active pixel sensors adapted for intensity readout. The pixel transistors may be FETs, e.g. MOSFETs (metal oxide semiconductor field effect transistors).

The pixel array unit 11 may be a one-dimensional pixel array with the photoelectric conversion elements of all active pixel circuits 100 arranged along a straight or meandering line (line sensor) in a semiconducting pixel substrate. In particular, the pixel array unit 11 may be a two-dimensional array, wherein the photoelectric conversion elements of the pixel circuits 100 may be arranged along straight or meandering rows and along straight or meandering lines in a horizontal plane of a pixel substrate.

The pixel circuits 100 may be connected along columns and along rows. A subset of pixel circuits 100 assigned to the same row form a pixel row. The pixel circuits 100 of the same pixel row may share common control lines and may be addressed synchronously. A subset of pixel circuits 100 assigned to the same column form a pixel column.

The pixel circuits 100 of the same pixel column share at least one common data signal line (vertical signal line). The pixel output signals of the pixel circuits 100 of the same pixel column are successively passed to the same data signal line per a time division multiplexing method.

The row decoder 12 and the row driver assembly 13 control driving of each pixel circuit 100 of the pixel array unit 11. In particular, the row decoder 12 may supply one or more control signals for designating the pixel circuit 100 or the pixel row to be controlled to the row driver assembly 13 according to an address signal from the sensor controller 15. The row driver assembly 13 may drive the pixel transistors of the pixel circuit 100 according to driver timing signals supplied from the sensor controller 15 and the control signals supplied from the row decoder 12.

The row driver assembly 13 may include a row driver unit 140 with one or more buffer circuits 141 per pixel row. Alternatively, two or more pixel rows or all pixel circuits 100 may share one, some or all of the buffer circuits 141. A voltage converter circuit 150 supplies one or more supply voltages to the row driver unit 140.

The output signals of the pixel circuits 100 (pixel output signals) are passed through the data signal lines to the readout circuit of the column signal processing unit 14.

The readout circuit may include one or more ADCs (analog-to-digital converters). The readout circuit may include as much ADCs as the pixel array unit 11 includes data signal lines or pixel columns. Alternatively, the number of ADCs may be lower than the number of pixel columns, wherein each ADC may be multiplexed between two or more of the data signal lines VSLs. Each ADC performs an analog-to-digital conversion on the pixel output signals successively read out from the respective pixel column. To this purpose, each ADC may include a comparator, a digital-to-analog converter (DAC) and a counter to convert each pixel output signal into digital pixel data DPXS.

The column signal processing unit 14 further includes a horizontal driving circuit that controls the elements of the readout circuit to pass the pixel data DPXS of the pixel columns to the signal processing unit 80. For pixel circuits 100 implementing event detection in addition to the intensity readout, the readout circuit may include additional circuits, e.g. latches, registers, or other type of memory elements for temporarily storing event data.

The sensor controller 15 controls the other components of the image sensor assembly 10. For example, the sensor controller 15 may supply the address to the row decoder 12 and may supply driving timing signals to the row driver assembly 13. In addition, the sensor controller 15 may supply one or more control signals for controlling the column signal processing unit 14, e.g. the horizontal driving circuit and the ADCs in the readout circuit.

The present disclosure concerns the row driver assembly 13, in particular an error detection circuit 160 that outputs an active error signal XERROR when an error condition concerning the voltage converter circuit 150 is fulfilled as explained in the following.

Figure 2:
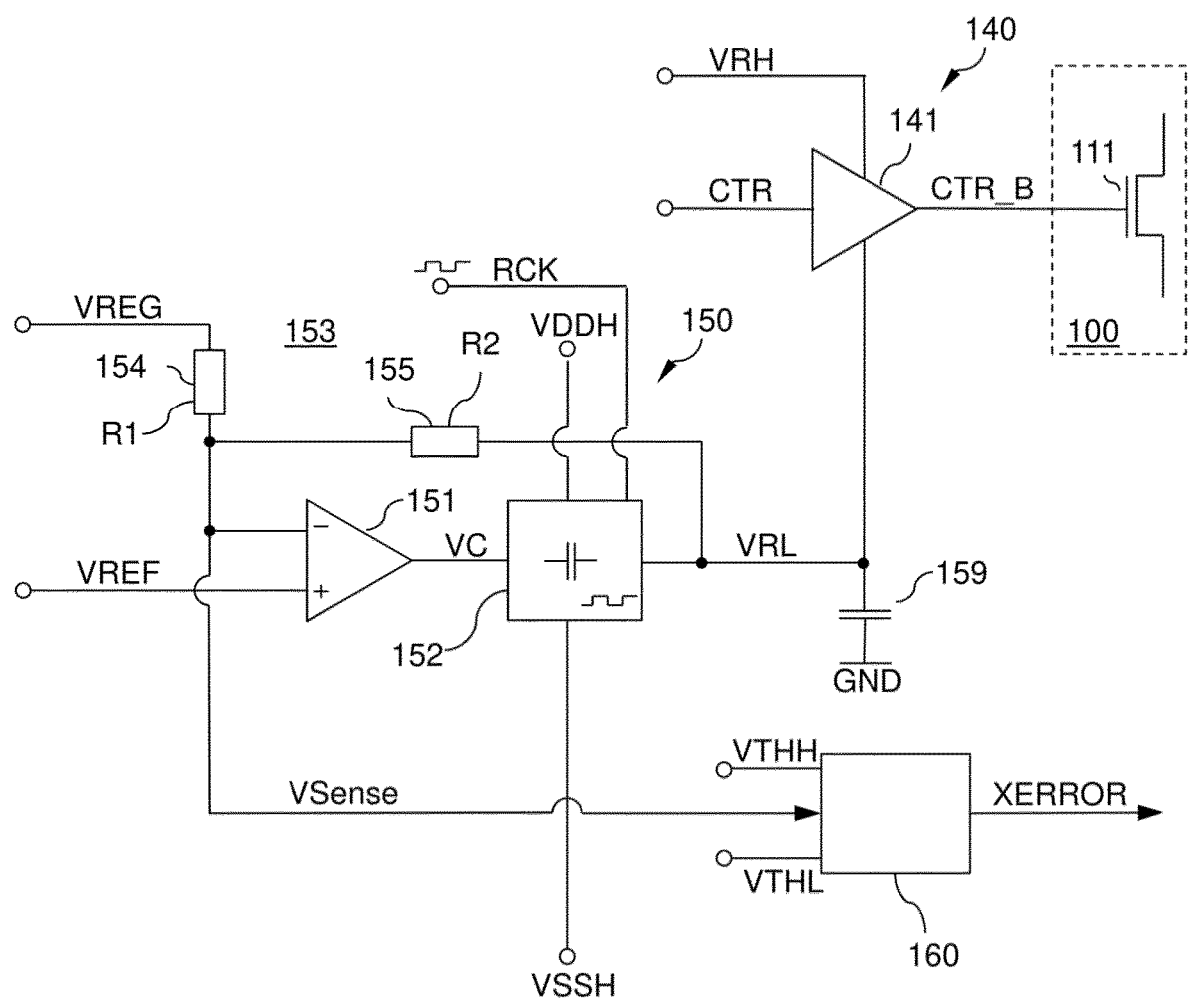
FIG. 2 is a simplified block diagram illustrating a configuration example of a row driver assembly including an error detection circuit according to an embodiment of the present technology.

FIG. 2 refers to a row driver assembly 13 with a row driver unit 140 that includes a buffer circuit 141. The buffer circuit 141 is electrically connected to a high buffer supply voltage VDDH and to a low buffer supply voltage VRL and drives a buffered control signal CTR_B to a pixel circuit 100. A voltage converter circuit 150 supplies the low buffer supply voltage VRL to the buffer circuit 141. An error detection circuit 160 outputs an active error signal XERROR when the low buffer supply voltage VRL is outside a target voltage window.

In particular, a constant voltage source can generate and drive a regulated constant voltage VREG regulated with respect to a voltage reference potential GND or VSS. A reference voltage VREF may be derived from the regulated constant voltage VREG. The voltage converter circuit 150 may generates the low buffer supply voltage VRL based on the regulated constant voltage VREG und the reference voltage VREF. The low buffer supply voltage VRL may have a higher voltage level or a lower voltage level than the reference voltage VREF. The low buffer supply voltage VRL and the reference voltage VREF may have the same polarity with regard to the voltage reference potential GND or may have opposite polarities. In particular, the low buffer supply voltage VRL may be negative.

The voltage converter circuit 150 may have comparatively high input impedance with regard to the reference voltage VREF and may have comparatively low output impedance with regard to the low buffer supply voltage VRL. The voltage converter circuit 150 supplies the low buffer supply voltage VRL to the buffer circuit 141.

The buffer circuit 141 may include an active amplifier circuit supplied with the low buffer supply voltage VRL and the high buffer supply voltage VRH. The voltage converter circuit 150 or another circuit supplies the high buffer supply voltage VRH, which may be a positive voltage. The voltage converter circuit 150 supplies the low buffer supply voltage VRL, which may be a negative voltage. A high buffer supply voltage line may connect an output of voltage source supplying the high buffer supply voltage VRH and a first supply voltage input of the buffer circuit 141. A low buffer supply voltage line may connect an output of the voltage converter circuit 150 and a second supply voltage input of the buffer circuit 141.

An output capacitor 159 connected between the output of the voltage converter circuit 150 and the voltage reference potential GND may smooth the low buffer supply voltage VRL. The output capacitor 159 may have a comparatively large capacitance in the range of some few µF.

The buffer amplifier 141 receives a digital pixel control signal CTR alternating between a buffer input low level and a buffer input high level and outputs a digital buffered pixel control signal CTR_B alternating between a buffer output low level and a buffer output high level. The buffer circuit 141 may be effective as level-shifter. In particular, the buffer output low level and the buffer input low level differ from each other and/or the buffer output high level and the buffer input high level differ from each other. The buffer circuit 141 may have comparatively high input impedance with regard to the pixel control signal CTR and may have comparatively low output impedance with regard to the buffered pixel control signal CTR_B.

The buffered and/or level-shifted pixel control signal CTR_B may be passed to one single pixel circuit 100, to the pixel circuits 100 of one or more pixel rows, to a portion of a pixel row, or to all pixel circuits 100 of the image sensor assembly. Each pixel circuit 100 may include a photoelectric conversion element and several pixel transistors, e.g. FETs. The pixel transistors may include a transfer transistor for temporarily connecting the photoelectric conversion element with a floating diffusion region, a reset transistor for presetting the floating diffusion to a pre-defined potential and a selection transistor for selectively connecting a pixel output node to a data signal line.

Depending on the type of the pixel circuit 100, the pixel transistors may include further FETs, e.g. a second transfer gate for a second photoelectric conversion device or floating diffusion gates for separating the floating diffusion into two or more parts.

The buffered and/or level-shifted pixel control signal CTR_B may be passed to the gate of any of the transfer transistor, the reset transistor and the selection transistor of a single pixel circuit or a plurality of the pixel circuits 100, e.g. all pixel circuits 100 of a pixel row or all pixel circuits 100 of the image sensor assembly. The voltage converter circuit 150 may generate and supply different low buffer supply voltages VRL for pixel transistors with different functions.

The error detection circuit 160 outputs an active error signal XERROR when the low buffer supply voltage VRL is outside a target voltage window. The information whether or not the low buffer supply voltage VRL is outside the target voltage window is obtained by comparing a voltage on hand in the voltage converter circuit 150, e.g. an internal voltage or an input voltage of the voltage converter circuit 150, with suitable threshold voltages VTHH, VTHL defining the target voltage window.

Analysis of image sensor assemblies revealed that improperly set low buffer supply voltages VRL for some pixel transistors increase the risk of certain pixel defects such as "white pixels". The error detection circuit 160 provides a safety mechanism that monitors the low buffer supply voltage VRL. In particular, the error detection circuit 160 detects whether the low buffer supply voltage VRL are within such target voltage windows that ensure a low risk of pixel defects.

The active error signal XERROR can be used in a test facility to sort out and/or rework faulty image sensor assemblies and/or during operation in the target application to inform the user and/or a higher-level process entity, e.g. a host processor, of the possibility that the current image information may be erroneous and based in part on pixels that are not operating correctly. For example, in the field of digital vision a host processor may consider information provided by the active error signal XERROR to adapt motion estimation routines accordingly and/or may inform the user.

According to FIG. 2 the voltage converter circuit 150 may include an amplifier circuit 151 with an inverting input and a non-inverting input and a charge pump circuit 152. The charge pump circuit 152 obtains the low buffer supply voltage VRL from a high supply voltage VDDH, a low supply voltage VSSH and an output voltage VC of the amplifier circuit 151. A feedback network 153 feeds back the low buffer supply voltage VRL to the inverting input of the amplifier circuit 151.

The amplifier circuit 151 may be an operational amplifier with the non-inverting input receiving the reference voltage VREF and with the inverting input receiving a feedback voltage from the feedback network 153.

The feedback network 153 may include a voltage divider, e.g. a resistive divider with a first resistor 154 and a second resistor 155. The first resistor 154 is connected between the regulated voltage VREG and the inverting input of the amplifier circuit 151. The second resistor 155 is connected between the output of the charge pump circuit 152 and the inverting input of the amplifier circuit 151. A sense voltage Vsense tapped at the inverting input is a function inter alia of the electrical resistance R1 of the first resistor 154 and the electrical resistance R2 of the second resistor 155. The amplifier circuit 151 drives an output voltage VC such that the voltage at the inverting input (sense voltage Vsense) approximates the reference voltage VREF, wherein the difference between the sense voltage Vsense and the reference voltage VREF is in the range of mVolts.

The output voltage VC of the amplifier circuit 151 is passed to the charge pump circuit 150 that receives the output voltage VC of the amplifier circuit 151 as input voltage. The amplifier circuit 151 further receives the high supply voltage VDDH, the low supply voltage VDDL, and at least one control signal RCLK. The charge pump circuit 150 uses one or more capacitors for temporary energetic charge storage to raise or lower or invert the input voltage (VC). The charge pump circuit 150 generates the low buffer supply voltage VRL by capacitive switching, wherein the low buffer supply voltage VRL is a function of the output voltage VC of the amplifier circuit 151.

Figure 3:
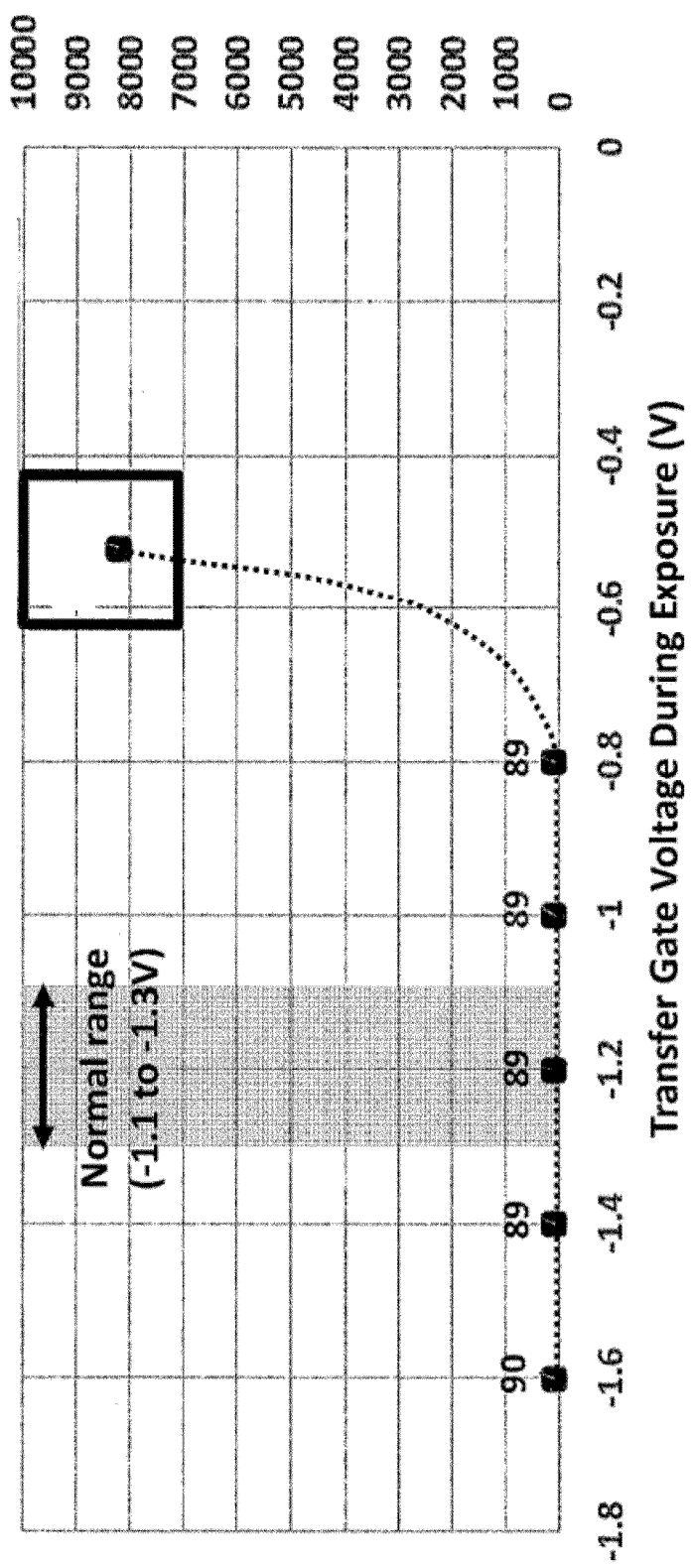
FIG. 3 is a schematic diagram showing the number of white pixels as a function of a negative buffer supply voltage for discussing effects of the embodiments.

FIG. 3 shows the result of a statistical analysis of the "white pixel" error in image sensor assemblies as a graph plotting the number of white pixels detected as a function of the transfer gate voltage during exposure. The transfer gate voltage is a function of the voltage level of the buffered transfer signal, wherein the low level of the buffered transfer signal depends on the low buffer supply voltage VRL. The nominal transfer gate voltage for the exposure is approximately −1.2V. When the transfer gate voltage for the exposure increases to values less negative than −0.8V, the number of white pixels detected significantly increases. The error detection circuit 160 provides a safety mechanism that monitors the low buffer supply voltage VRL. In particular, the error detection circuit 160 can detect whether the low buffer supply voltage VRL of the buffer circuit 141 that supplies the transfer gate signal is within such a target voltage window that ensures that the number of white pixels is below a predefined limit.

Figure 4:
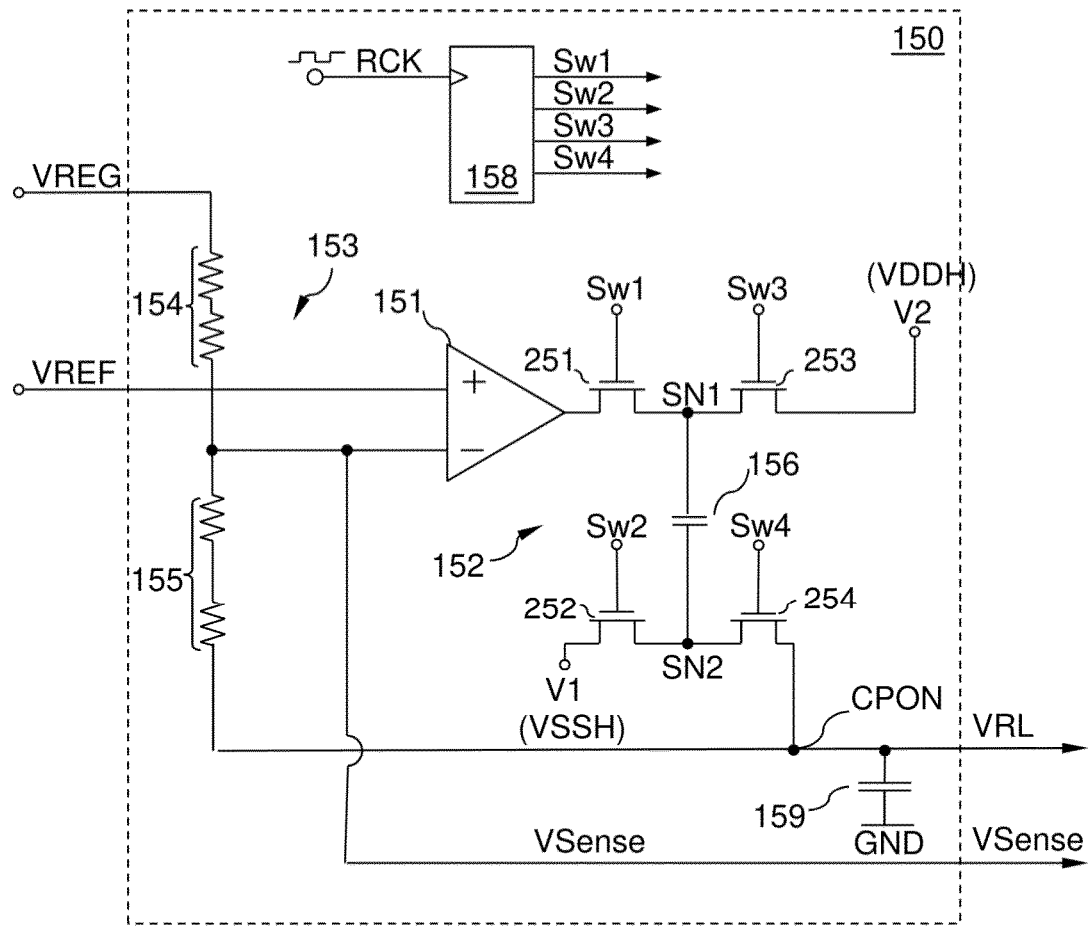
FIG. 4 is a simplified circuit diagram illustrating a configuration example of a row driver assembly according to an embodiment with a voltage converter circuit including a charge pump circuit.

FIG. 4 shows an embodiment with the charge pump circuit 152 including a charge pump capacitance 156 and switches 157 electrically connected to the charge pump capacitance 156. The charge pump circuit 152 obtains the low buffer supply voltage VRL by alternatingly connecting the charge pump capacitance 156 to an output of the amplifier circuit 151, to the high supple voltage VDDH, to the low supply voltage VSSH and to a charge pump output node CPON.

For example, the switches of the charge pump circuit 152 may include a first FET 251, a second FET 252, a third FET 253 and fourth FET 254, and the charge pump circuit 152 may have a function of inverting the amplifier output voltage VC. Each of the switches may be an n channel FET or a p channel FET, with the channel type selected based on the voltage levels to be switched by the respective FET.

A switch control circuit 158 receives a clock signal RCK and may output one, two or more digital switch control signals. FIG. 4 shows four different switch control signals Sw1, Sw2, Sw3, Sw4 for illustrative purpose and includes embodiments of the switch control circuit 158 with each switch switching at other points in time. According to other examples, the switches may switch in pairs, i.e. first two of the switches 157 switch synchronously and the other two switches switch synchronously, too. In such case only two switch control signals are required, one for the first two switches and one for the other two switches, provided the switches of the same pair have the same channel type. And if the two pairs of switches switch oppositely, one single switch control signal may be sufficient as the case may be.

The load path of the first FET 251 is connected between the output of the amplifier circuit 251 and a first switching node SN1. The first switch control signal Sw1 is passed to the gate of the first FET 251.

The load path of the second FET 252 is connected between a first supply potential V1 and a second switching node SN2. The second switch control signal Sw2 is passed to the gate of the second FET 252.

The load path of the third FET 253 is connected between the first switching node SN1 and a second supply potential V2. The third switch control signal Sw3 is passed to the gate of the third FET 253.

The load path of the fourth FET 254 is connected between the second switching node SN2 and the output node CPON. The fourth switch control signal Sw4 is passed to the gate of the fourth FET 254.

The charge pump capacitor 156 has a first electrode (first terminal) connected to the first switching node SN1, and a second electrode (second terminal) connected to the second switching node SN2. The first potential V1 may be equal to or lower than the second potential V2. For example, the first potential V1 may be a low supply voltage VSSH that may be a voltage equal to or approximating the voltage reference potential GND (or VSS). The second potential V2 may be a high supply voltage VDDH.

For a first charge pump phase the first and second switch control signals SW1, SW2 may turn on the first and second FETs 251, 252 and the third and fourth switch control signals SW3, SW4 may turn off the third and second FETs 253, 254. The charge pump capacitor 156 is charged with a capacitor voltage Vcap resulting from the difference between VC and VSSH.

For a second charge pump phase the first and second switch control signals SW1, SW2 may turn off the first and second FETs 251, 252 and the third and fourth switch control signals SW3, SW4 may turn on the third and second FETs 253, 254. The voltage at the output node CPON results from the difference between VDDH and the capacitor voltage Vcap. If Vcap is greater than VDDH, the output voltage of the voltage converter circuit 150 (low buffer supply voltage VRL) is negative.

The output capacitor 159 connected between the output node CPON and the voltage reference potential GND may smooth the low buffer supply voltage VRL supplied from the charge pump circuit 152 to the buffer circuit 141 of FIG. 2.

The inverting input of the amplifier circuit 151 and an input of the error detection circuit 160 may be electrically connected. In other words, the sense signal Vsense is tapped from the inverting input of the amplifier circuit 151 and passed to the input of the error detection circuit 160.

Figure 5:
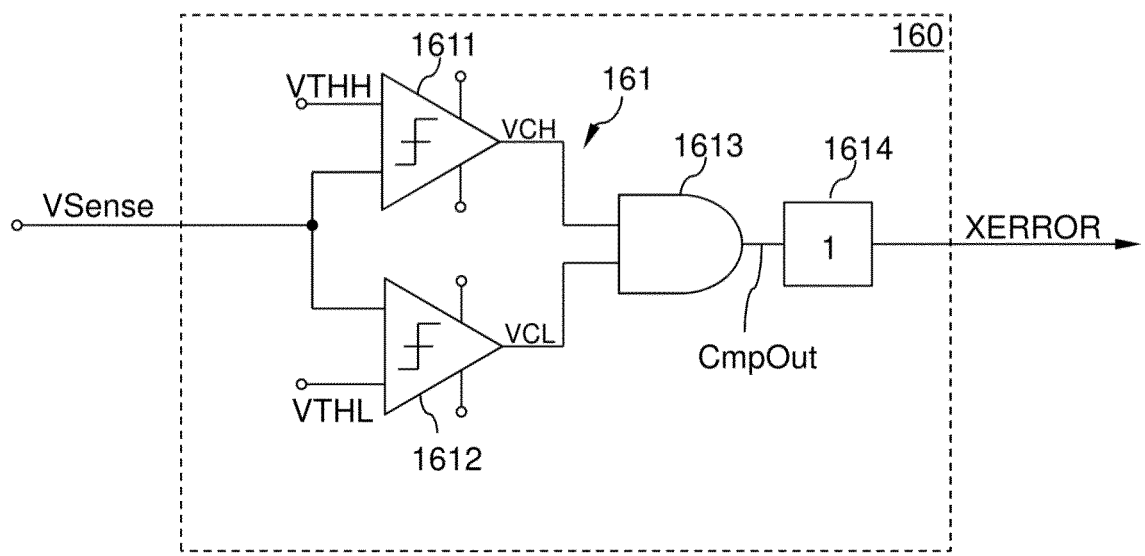
FIG. 5 is a simplified circuit diagram illustrating a configuration example of an error detection circuit according to an embodiment with the error detection circuit including a comparator circuit.

As illustrated in FIG. 5 the error detection circuit 160 may include a comparator circuit 161 with a first threshold input electrically connected to a high threshold voltage VTHH and with a second threshold input electrically connected to a low threshold voltage VTHL. The comparator circuit 161 outputs an active error signal XERROR only when a signal at the input of the error detection circuit 160 is higher than the high threshold voltage VTHH or lower than the low threshold voltage VTHL.

To this purpose the comparator circuit 161 may include a first stage 1611 comparing the sense signal Vsense with the high threshold voltage VTHH and a second stage 1612 comparing the sense signal Vsense with the low threshold voltage VTHL. An OR gate 1613 may receive the output signal VCH of the first stage 1611 and the output signal VCL of the second stage 1612 and generates a comparator output signal CmpOut. A level shifter 1614 may adjust the voltage levels of the digital active error signal XERROR to interface with further electronic circuits processing the active error signal XERROR.

Figure 6:
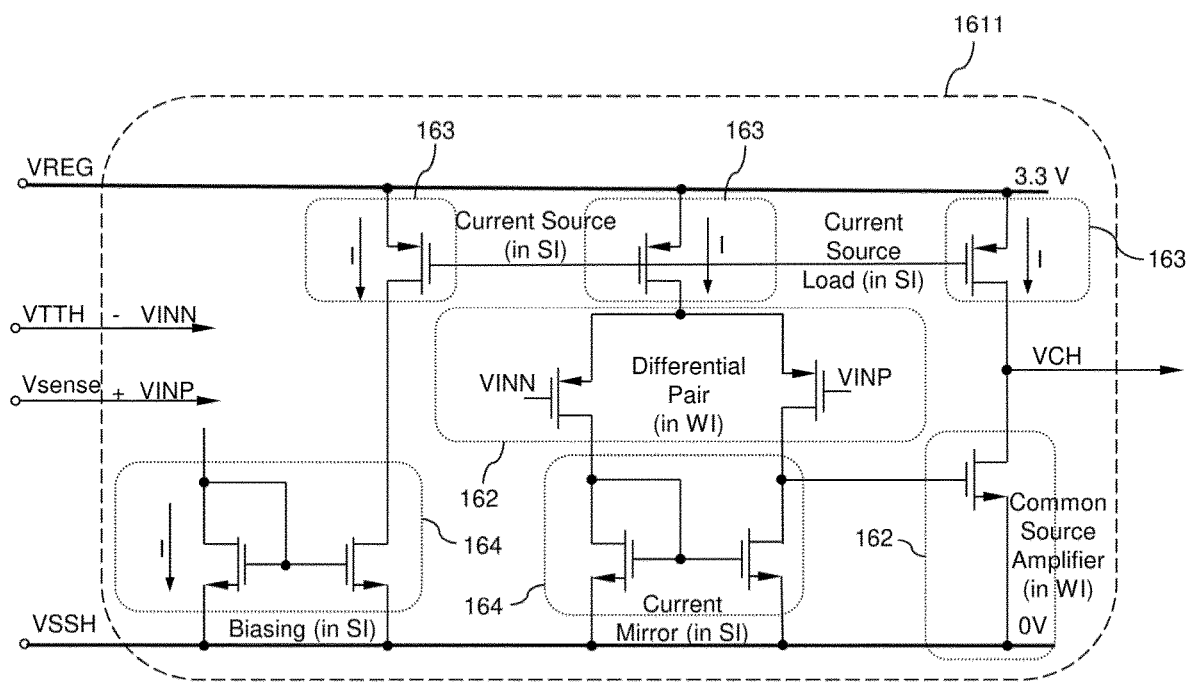
FIG. 6 is a simplified circuit diagram illustrating a configuration example of a comparator circuit for an error detection circuit according to an embodiment with the comparator circuit including input circuits with transistors operating at weak or moderate inversion.

FIG. 6 shows details of the first stage of 1611 of the comparator circuit 161. The second stage 1612 may have the same configuration.

The comparator circuit 161 may include input circuits 162 that include transistors configured to operate at weak or moderate inversion (WI), current source circuits 163 that include transistors configured to operate at strong inversion (SI), and current mirror and other load circuits 164 that include transistors configured to operate at strong inversion (SI). In such configuration, the offset of the comparator circuit 161 is low. The bias current may be in a range of several µA and the sensitivity may be in the range of some mV.

Figure 7:
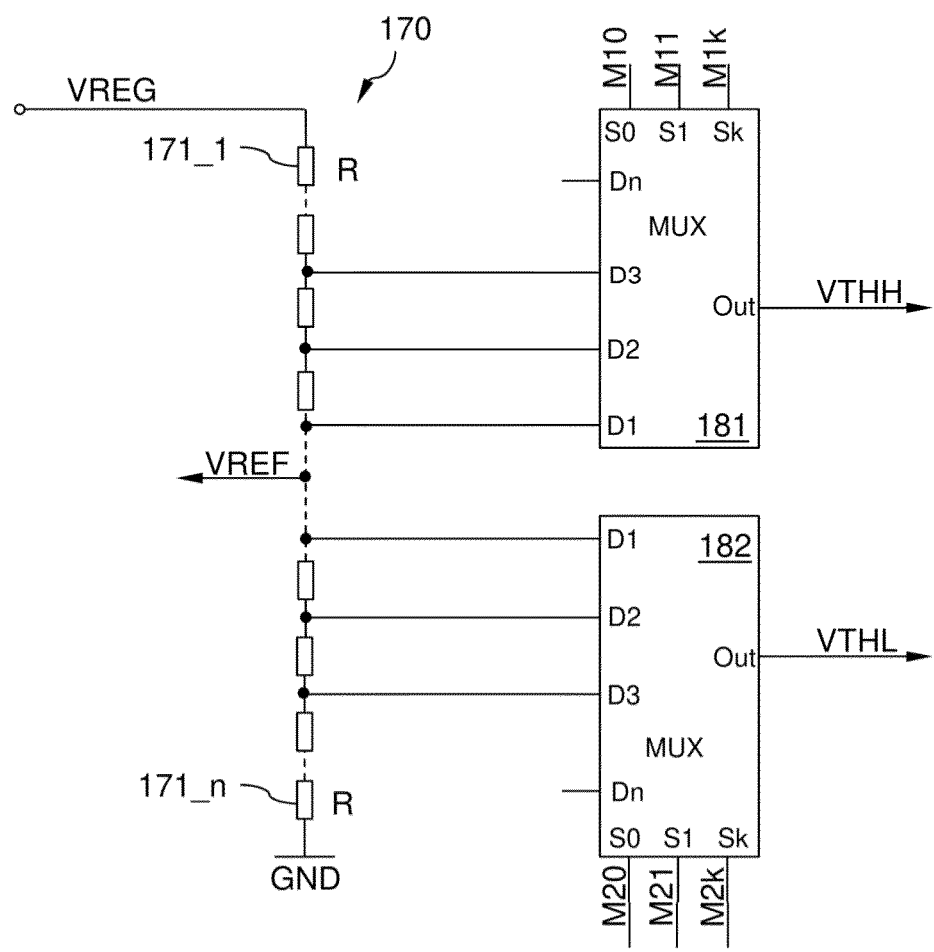
FIG. 7 is a simplified circuit diagram illustrating a configuration example of a threshold generation circuit for an error detection circuit according to the present technology.

FIG. 7 concerns the derivation of some of the voltages used in the voltage converter circuit 150 and the error detection circuit 160 by using a constant voltage source.

To this purpose, the image sensor assembly may include a resistor ladder 170 that includes a plurality of unit resistors 171_1, ..., 171_n electrically arranged in series between a regulated voltage VREG and a voltage reference potential GND. The error detection circuit 160 obtains the high threshold voltage VTHH and the low threshold voltage VTHL from tapping nodes of the resistor ladder 170 between electrically neighboring unit resistors 171.

A first end of the resistor ladder 170 is connected to a positive voltage supply line supplying the regulated voltage VREG. A second end of the resistor ladder 170 is connected to a voltage reference line distributing the voltage reference potential GND. The number of unit resistors 171 may be approximately 100. The regulated voltage VREG may be 1.5V and the voltage steps between neighboring nodes of the resistor ladder 170 may be 15 mV, by way of example. The reference voltage VREF or a copy of the reference voltage VREF may be tapped directly from a node of the resistor ladder supplying 455 mV.

The unit resistors 171 can be formed with low deviations from each other. Process deviations affecting the resistance of the unit resistors 171 typically influence all unit resistors 171 in the same way and have only low impact on the voltages tapped from the resistor ladder 170. The tapping nodes of the resistor ladder provide precise reference voltages directly derived from the regulated voltage VREG.

The reference voltage VREF and the threshold voltages VTHH, VTHL for the comparator circuit 161 of FIG. 5 are derived from voltages depending in the same way from the regulated voltage VREG. In the illustrated embodiment the reference voltage VREF and the threshold voltages VTHH, VTHL for the comparator circuit 161 of FIG. 5 are derived from different nodes of the same resistor ladder 170.

Analog inputs of a first multiplexer 181 are connected to different tapping nodes of the resistor ladder 170 and an output of the first multiplexer 181 is connected to the first threshold input of the comparator circuit 161 of FIG. 5. Analog inputs of a second multiplexer 182 are connected to different tapping nodes of the resistor ladder 170 and an output of the second multiplexer 182 is connected to the second threshold input of the comparator circuit 161 of FIG. 5. The tapping nodes for the first and second multiplexer 181,182 may overlap in the sense, that the tapping node providing the highest voltage for the second multiplexer 182 may provide a higher voltage than the tapping node providing the lowest voltage for the first multiplexer 181. The control words for the multiplexer may be temporarily latched in registers or may be permanently programmed. The registers for controlling the multiplexers 181, 182 may be accessible for a higher-level process entity and/or the sensor controller 15 of FIG. 1, by way of example.

A higher process entity, e.g. the sensor controller 15 illustrated in FIG. 1 may generate digital multiplexer control signals M10, ..., M1k, M20, ..., M2k and may pass the multiplexer control signals M11, ... M1k to the control inputs of the first multiplexer 181 and may pass the multiplexer control signals M20, ..., M2k to the control inputs of the second multiplexer 182. Alternatively, a monitor/service interface of the image sensor assembly may receive the multiplexer control signals M10, ..., M1k, M20, ..., M2k and may pass the multiplexer control signals M10, ..., M1k, M20, ..., M2k to the control inputs of the first and second multiplexers 181, 182.

In response to the received multiplexer control signals M10, ..., M1k the first multiplexer 181 selects one of the analog inputs D1, ... DN to electrically connect the respective tapping node of the resistor ladder 170 with the high threshold input of the comparator circuit 161 illustrated in FIG. 5. In response to the received multiplexer control signals M20, ..., M2k the second multiplexer 182 selects one of the analog inputs D1, ... DN to electrically connect the respective tapping node of the resistor ladder 170 with the low threshold input of the comparator circuit 161 illustrated in FIG. 5.

Figure 8:
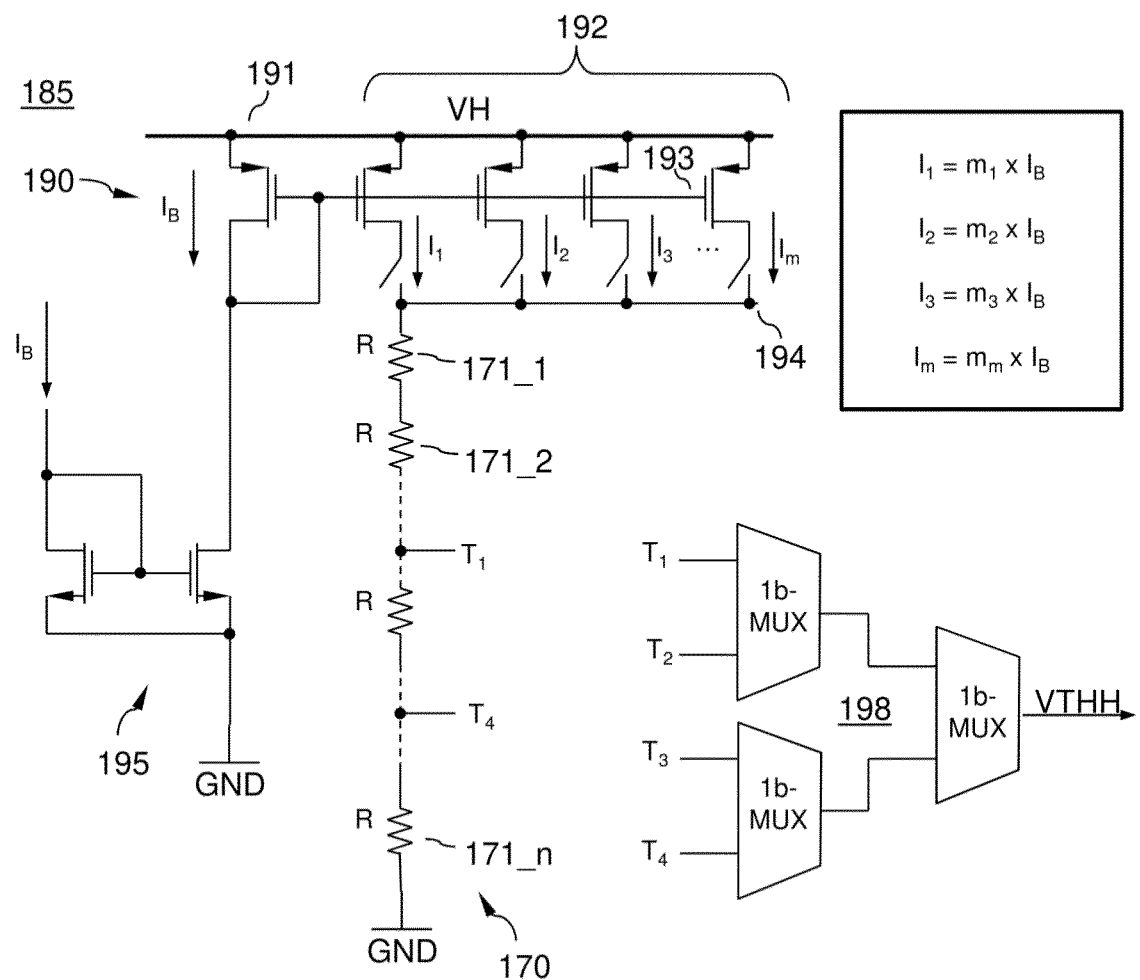
FIG. 8 is a simplified circuit diagram illustrating another configuration example of a threshold generation circuit for an error detection circuit according to the present technology.

FIG. 8 concerns the derivation of some of the voltages used in the voltage converter circuit 150 and the error detection circuit 160 by using constant current sources.

A resistor ladder 170 includes a plurality of unit resistors 171_1, ..., 171_n electrically arranged in series. A tunable current source circuit 185 impresses a tunable constant current through the resistor ladder 170. The error detection circuit 150 obtains the high threshold voltage VTHH and the low threshold voltage VTHL from electric tapping nodes of the resistor ladder 170 between electrically neighboring unit resistors 171.

The tunable current source circuit 185 includes a current mirror 190 with a current-to-voltage converter stage 191 and a switchable voltage-to-current converter stage 192. The load path of the current-to-voltage converter stage 191 may include a biasing circuit 195 based on a current mirror.

The switchable voltage-to-current converter stage 192 may include a plurality of converter paths electrically connected in parallel between a supply voltage VH and a first unit resistor 171_1 of the resistor ladder 170. Each converter path may include a voltage-to-current converter transistor 193 and a transistor switch 194 electrically connected in series with each other. The gates of the voltage-to-current converter transistors 193 may be electrically connected with each other.

Selected ones of the nodes T1, ..., T4 of the resistor ladder are connected to analog inputs of a multiplexer stage 198 that outputs the high threshold voltage VTHH for the comparator circuit 161 in FIG. 5. A higher process entity, e.g. the sensor controller 15 of FIG. 1 or a host processor controls the transistor switches 194 and the control inputs of the multiplexer stage 195 to select an appropriate high threshold voltage VTHH.

Instead of copying voltages as for the embodiment of FIG. 7, the implementation of FIG. 8 works by copying currents. A bias current generated from a master current is copied in order to have a tunable current for biasing the resistor ladder 170. Different nodes may be selected for tapping and by using six 1b-multiplexers the high and low threshold voltages VTHH, VTHL are obtained.

In particular the bias current IB is obtained by using the master current, wherein current mirrors and current sources are sized to assure a good matching. Fractions of the bias current are created in such a way that a certain voltage step, e.g. 15 mV, can be achieved from case to case. Definition of the default operation includes choosing the tapping nodes accordingly for each negative buffer supply voltage of interest. Tuning the bias current facilitates covering a larger than 200 mV range for both the high and low threshold voltages VTHH, VTHL in steps of 15 mV. The detection scheme is defined by programming the bias current and configuring the 1b multiplexers for the selection of a suitable tapping node to meet the required accuracy and target voltage.

A similar scheme may be applied for the lower threshold voltage VTHL. The difference may just be the choice of the tapping nodes which are connected to the analog inputs of the multiplexer stage 198. The same resistor ladder 170 may provide the tapping nodes for both the high threshold voltage VTHH and the low threshold voltage VTHL. The same or different equivalent blocks may be provided for each voltage to be monitored.

Figure 9:
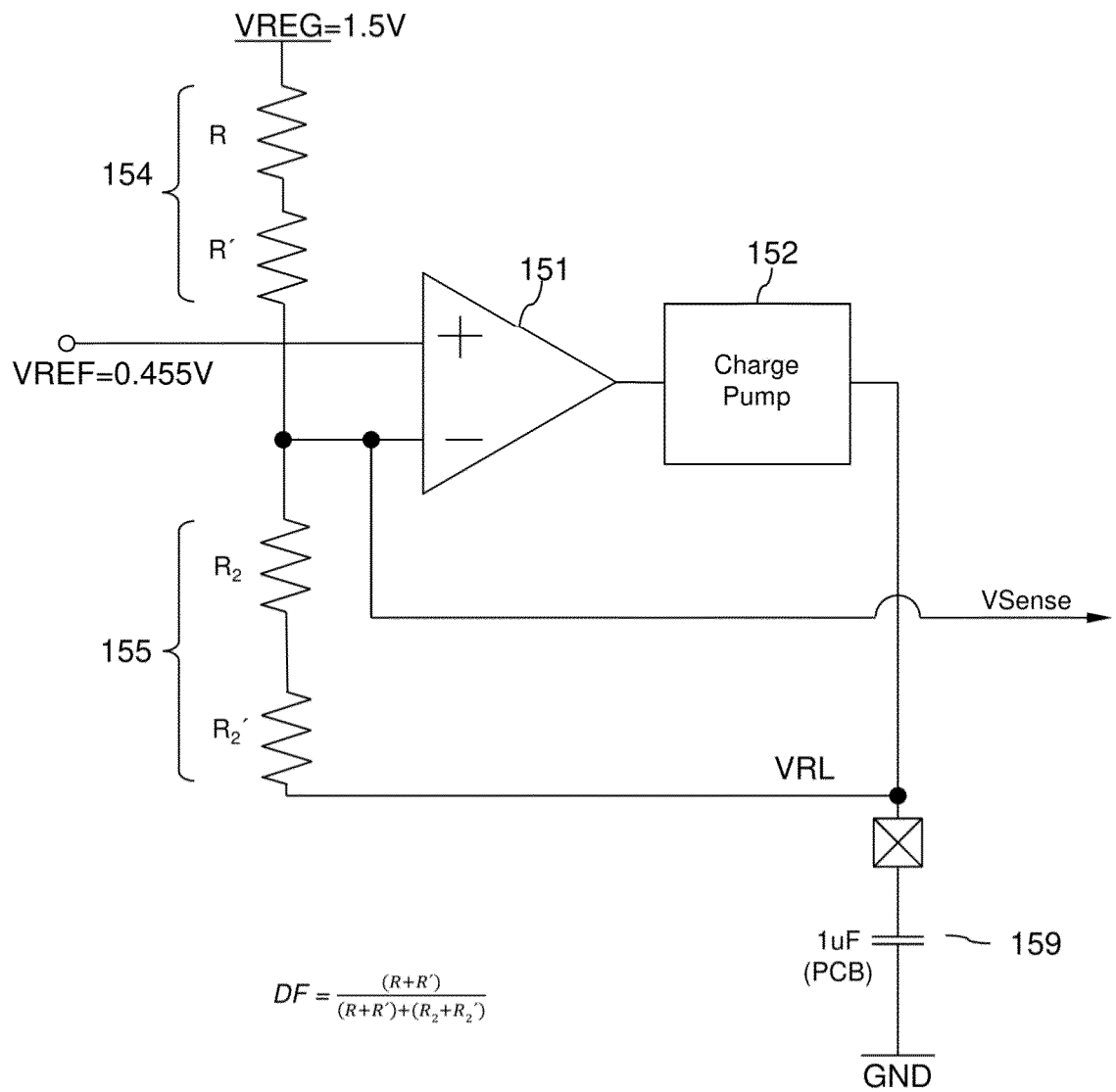
FIG. 9 is a simplified circuit diagram illustrating another configuration example of the voltage converter circuit for discussing effects of the present technology.

FIG. 9 refers to an example for determining the high and low threshold voltages VTHH, VTHL with a ratio of the electrical resistance $R2=R_2+R_{2'}$ of the second resistor 155 to the electrical resistance $R1=R_1+R_{1'}$ of the first resistor 154 equal 1.65/1.05. The resulting damping factor DF=R1/(R1+R2) is equal 0.39. The center of the (negative) target voltage window is assumed with V=−1.2V. The tolerance window shall be ±20% resulting in a target voltage window of −1.2V±240 mV for the low buffer supply voltage VRL. The respective target voltage window for the sense voltage Vsense results from multiplying the window range with the damping factor DF, i.e. ±240 mV*DF=±93.6 mV. The ±93.6 mV give the allowable window around VREF=0.455V for the sense voltage Vsense. The taps from the resistor ladders 170 of FIG. 7 or FIG. 8 are selected accordingly to approximate the ±93.6 mV tolerance window for the sense voltage Vsense.

The row driver unit 140 of FIG. 1 may include a plurality of voltage converter circuits 150 configured to supply different low buffer supply voltages and may include an error detection circuit 160 for each of the voltage converter circuits 150.

Figure 10:
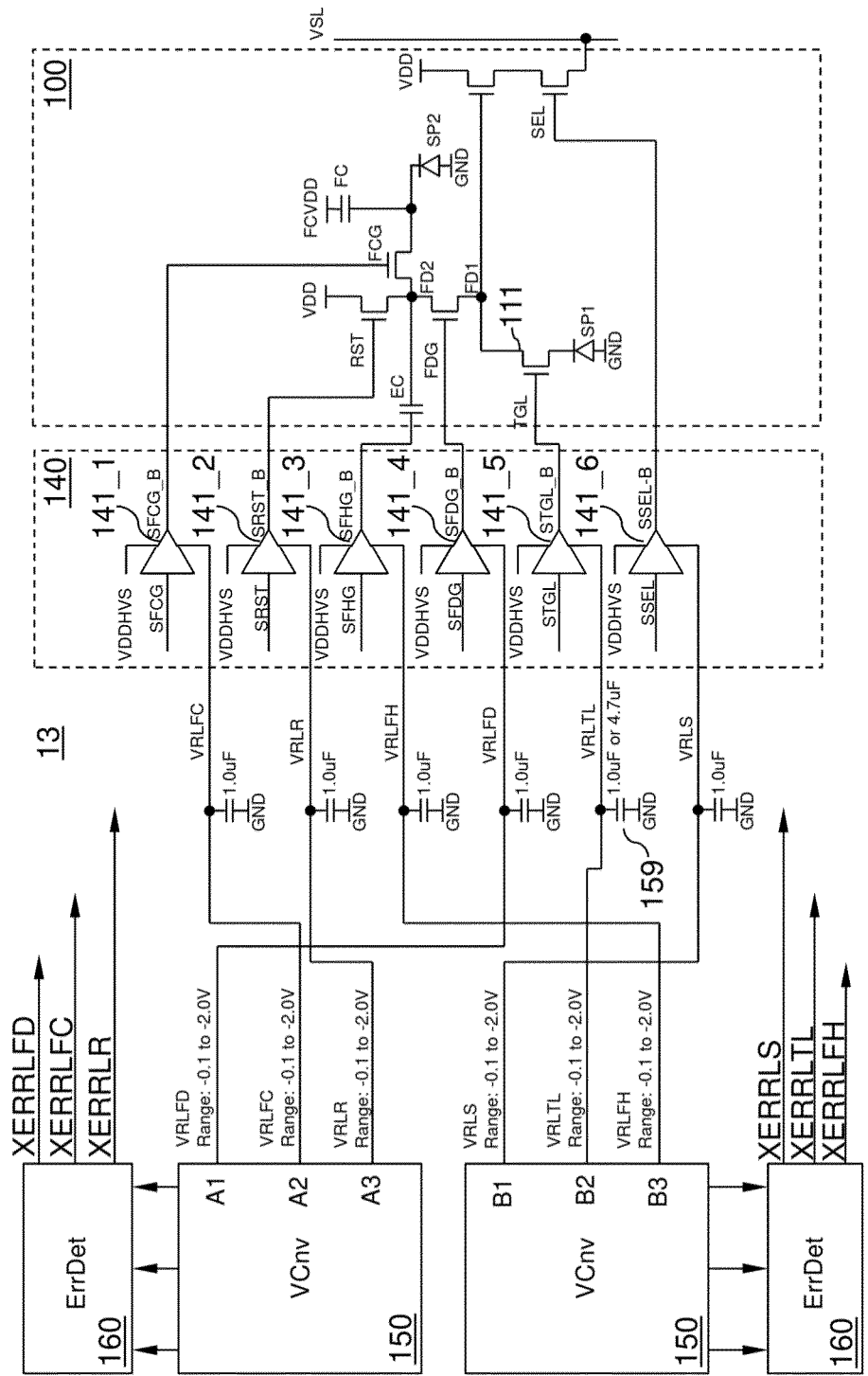
FIG. 10 is a simplified combined block and circuit diagram illustrating another configuration example of the row driver assembly of the present technology.

FIG. 10 refers to a high dynamic range solid-state imaging device with each pixel circuit 100 including a single large photodiode SP1 and a single small photodiode SP2 as photoelectric conversion elements, an in-pixel floating capacitor FC, an in-pixel extension capacitor EC and six pixel transistors.

The large photodiode SP1 has a high sensitivity which may be about 10 times that of the small photodiode SP2. The pixel transistors include a transfer gate TGL for the large photodiode SP1, a floating diffusion gate FDG, a floating capacitor gate FCG, a reset transistor RST, a select transistor SEL, and an amplifier transistor AMP in source follower configuration with a constant current source connected to the data signal line VSL.

The floating diffusion gate FDG separates a floating diffusion in two parts FD1 and FD2. The floating capacitor FC may be connected between the cathode of the small photodiode SP2 and a counter electrode with a supply voltage of FCVDD. An extension capacitor EC may be connected between FD2 and a counter electrode driven by the row driver unit 140.

Other embodiments may provide a seventh transistor as transfer gate for the small photodiode SP2 between the cathode of the small photodiode SP2 and the floating capacitor FC such that the floating diffusion gate FDG and the floating capacitor gate FCG separate the floating diffusion in three parts.

Buffer circuits 141_1, . . . , 141_6 drive buffered control signals for the pixel circuits 100. A first buffer circuit 141_1 receives a floating capacitor gate signal SFCG and drives a buffered and/or level-shifted floating capacitor gate signal SFCG_B. An output of the first buffer circuit 141_1 is connected to the floating capacitor gate FCG.

A second buffer circuit 141_2 receives a reset transistor signal SRST and drives a buffered and/or level-shifted reset transistor signal SRST_B. An output of the second buffer circuit 141_2 is connected to the gate of the reset transistor RST.

A third buffer circuit 141_3 receives an auxiliary signal SFHG and drives a buffered and/or level-shifted auxiliary signal SFHG_B. An output of the third buffer circuit 141_3 is connected to the counter electrode of the extension capacitor EC.

A fourth buffer circuit 141_4 receives a floating diffusion gate signal SFDG and drives a buffered and/or level-shifted floating diffusion gate signal SFDG_B. An output of the fourth buffer circuit 141_4 is connected to the floating diffusion gate FDG.

A fifth buffer circuit 141_5 receives a transfer gate signal STGL for the large photodiode SP1 and drives a buffered and/or level-shifted transfer gate signal STGL_B. An output of the fifth buffer circuit 141_5 is connected to the transfer gate TGL for the large photodiode SP1.

A sixth buffer circuit 141_6 receives a select transistor signal SSEL and drives a buffered and/or level-shifted select transistor signal SSEL_B. An output of the sixth buffer circuit 141_6 is connected to the gate of the select transistor SEL.

The buffer circuits 141_1, . . . , 141_6 are supplied with the same positive high buffer supply voltage VDDHVS. Each buffer circuit 141, . . . , 141_6 may be supplied with an individual low buffer supply voltage, wherein each individual low buffer supply voltage may be negative, e.g. in a range from −0.1V to −2.0V.

In particular, the row driver assembly 13 may include a voltage converter circuit 150 generating a first low buffer supply voltage VRLFC and supplying the first low buffer supply voltage VRLFC to the first buffer circuit 141_1. Another voltage converter circuit 150 generates a second low buffer supply voltage VRLR and supplies the second low buffer supply voltage VRLR to the second buffer circuit 141_2. Another voltage converter circuit 150 generates a third low buffer supply voltage VRLFH and supplies the third low buffer supply voltage VRLFH to the third buffer circuit 141_3.

Another voltage converter circuit 150 generates a fourth low buffer supply voltage VRLFD and supplies the fourth low buffer supply voltage VRLFD to the fourth buffer circuit 141_4. Another voltage converter circuit 150 generates a fifth low buffer supply voltage VRLTL and supplies the fifth low buffer supply voltage VRLTL to the fifth buffer circuit 141_5. Another voltage converter circuit 150 generates a sixth low buffer supply voltage VRLS and supplies the sixth low buffer supply voltage VRLS to the sixth buffer circuit 141_6.

Error detection circuits 160 with individual target voltage windows may be assigned to selected ones or to all low buffer supply voltages.

A first error detection circuit 160 outputs a first active error signal XERRLFC when the first low buffer supply voltage VRLFC is outside a target window. A second error detection circuit 160 outputs a second active error signal XERRLR when the second low buffer supply voltage VRLR is outside a target window. A third error detection circuit 160 outputs a third active error signal XERRLFH when the third low buffer supply voltage VRLFH is outside a target window. A fourth error detection circuit 160 outputs a fourth active error signal XERRLFD when the fourth low buffer supply voltage VRLFD is outside a target window. A fifth error detection circuit 160 outputs a fifth active error signal XERRLTL when the fifth low buffer supply voltage VRLTL is outside a target window. A sixth error detection circuit 160 outputs a sixth active error signal XERRLS when the sixth low buffer supply voltage VRLS is outside a target window.

Figure 11:
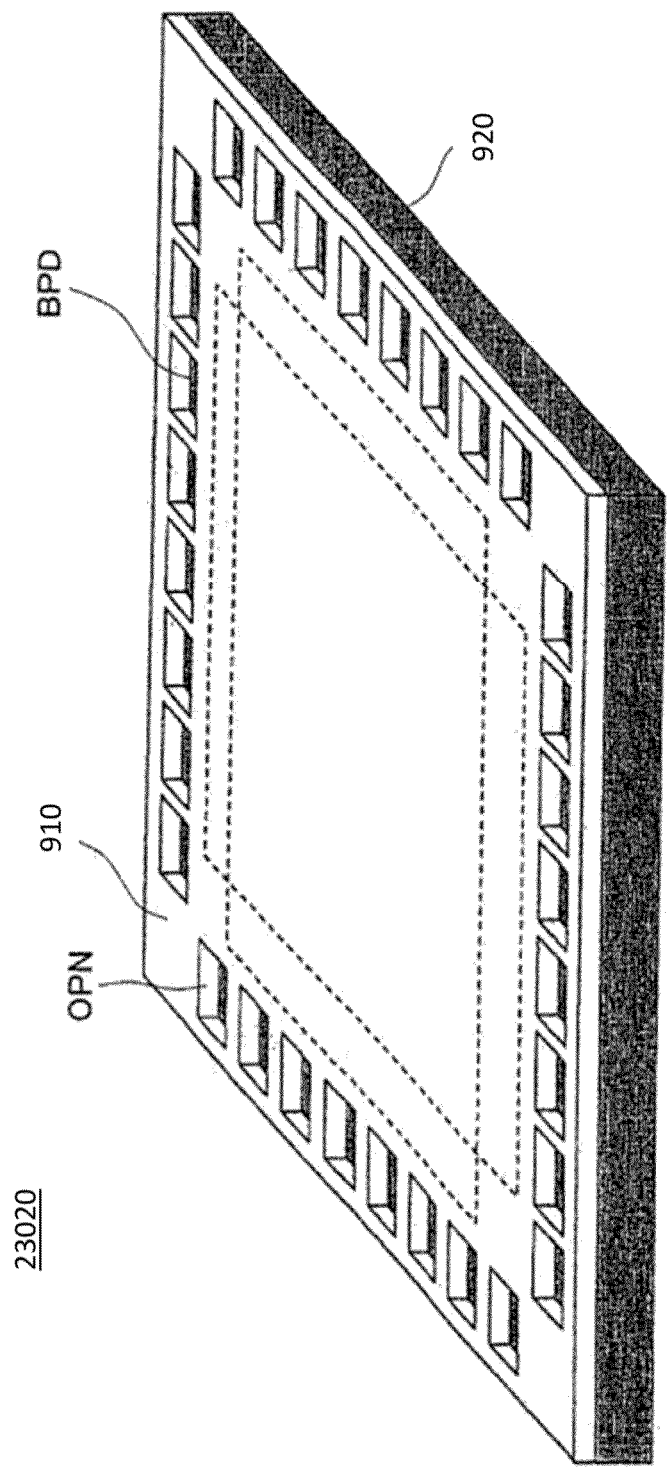
FIG. 11 is a diagram showing an example of a laminated structure of a solid-state imaging device according to an embodiment of the present disclosure.

FIG. 11 is a perspective view showing an example of a laminated structure of a solid-state imaging device 23020 with a plurality of pixels arranged matrix-like in array form. Each pixel includes at least one photoelectric conversion element.

The solid-state imaging device 23020 has the laminated structure of a first chip (upper chip) 910 and a second chip (lower chip) 920. The laminated first and second chips 910, 920 may be electrically connected to each other through TC(S)Vs (Through Contact (Silicon) Vias) formed in the first chip 910. The solid-state imaging device 23020 may be formed to have the laminated structure in such a manner that the first and second chips 910 and 920 are bonded together at wafer level and cut out by dicing.

In the laminated structure of the upper and lower two chips, the first chip 910 may be an analog chip (sensor chip) including at least one analog component of each pixel circuit, e.g., the photoelectric conversion elements arranged in array form.

For example, the first chip 910 may include only the photoelectric conversion elements of the pixel circuits as described above with reference to the preceding FIGS. Alternatively, the first chip 910 may include further elements of each pixel circuit. For example, the first chip 910 may include, in addition to the photoelectric conversion elements, at least the transfer transistor, the reset transistor, the amplifier transistor, and/or the selection transistor of the pixel circuits. Alternatively, the first chip 910 may include each element of the pixel circuit.

The second chip 920 may be mainly a logic chip (digital chip) that includes the elements complementing the elements on the first chip 910 to complete pixel circuits and current control circuits. The second chip 920 may also include analog circuits, for example circuits that quantize analog signals transferred from the first chip 910 through the TCVs. For example, the second chip 920 may include all or at least some of the components of the row driver assembly.

The second chip 920 may have one or more bonding pads BPD and the first chip 910 may have openings OPN for use in wire-bonding to the second chip 920. The solid-state imaging device 23020 with the laminated structure of the two chips 910, 920 may have the following characteristic configuration:

The electrical connection between the first chip 910 and the second chip 920 is performed through, for example, the TCVs. The TCVs may be arranged at chip ends or between a pad region and a circuit region. The TCVs for transmitting control signals and supplying power may be mainly concentrated at, for example, the four corners of the solid-state imaging device 23020, by which a signal wiring area of the first chip 910 can be reduced.

Figure 12:
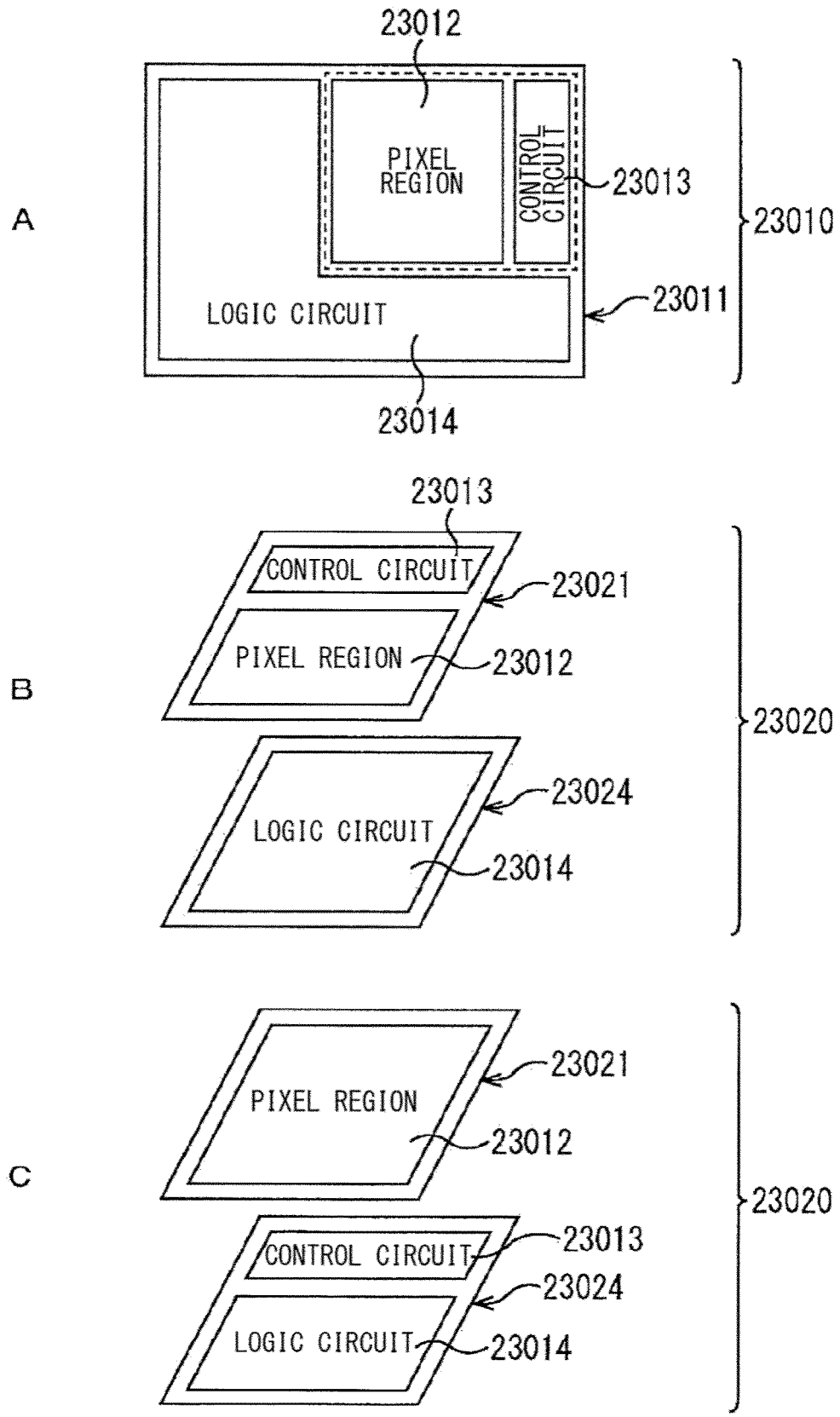
FIG. 12 illustrates an overview of a configuration example of a multi-layer solid-state imaging device to which a technology according to the present disclosure may be applied.

FIG. 12 illustrates schematic configuration examples of solid-state imaging devices 23010, 23020.

The single-layer solid-state imaging device 23010 illustrated in part A of FIG. 12 includes a single die (semiconductor substrate) 23011. Mounted and/or formed on the single die 23011 are a pixel region 23012 (photoelectric conversion elements), a control circuit 23013 (readout circuit, threshold controller), and a logic circuit 23014 (parts of pixel circuits, row driver). In the pixel region 23012, pixels are disposed in an array form. The control circuit 23013 performs various kinds of control including control of driving the pixels. The logic circuit 23014 performs signal processing.

Parts B and C of FIG. 12 illustrate schematic configuration examples of multi-layer solid-state imaging devices 23020 with laminated structure. As illustrated in parts B and C of FIG. 12, two dies (chips), namely a sensor die 23021 (first chip) and a logic die 23024 (second chip), are stacked in a solid-state imaging device 23020. These dies are electrically connected to form a single semiconductor chip.

With reference to part B of FIG. 12, the pixel region 23012 and the control circuit 23013 are formed or mounted on the sensor die 23021, and the logic circuit 23014 is formed or mounted on the logic die 23024. The logic circuit 23014 may include at least parts of the pixel circuits and the row driver assembly as described with reference to the preceding FIGS. The pixel region 23012 includes at least the photoelectric conversion elements.

With reference to part C of FIG. 12, the pixel region 23012 is formed or mounted on the sensor die 23021, whereas the control circuit 23013 and the logic circuit 23014 are formed or mounted on the logic die 23024.

According to another example (not illustrated), the pixel region 23012 and the logic circuit 23014, or the pixel region 23012 and parts of the logic circuit 23014 may be formed or mounted on the sensor die 23021, and the control circuit 23013 is formed or mounted on the logic die 23024.

Figure 13:
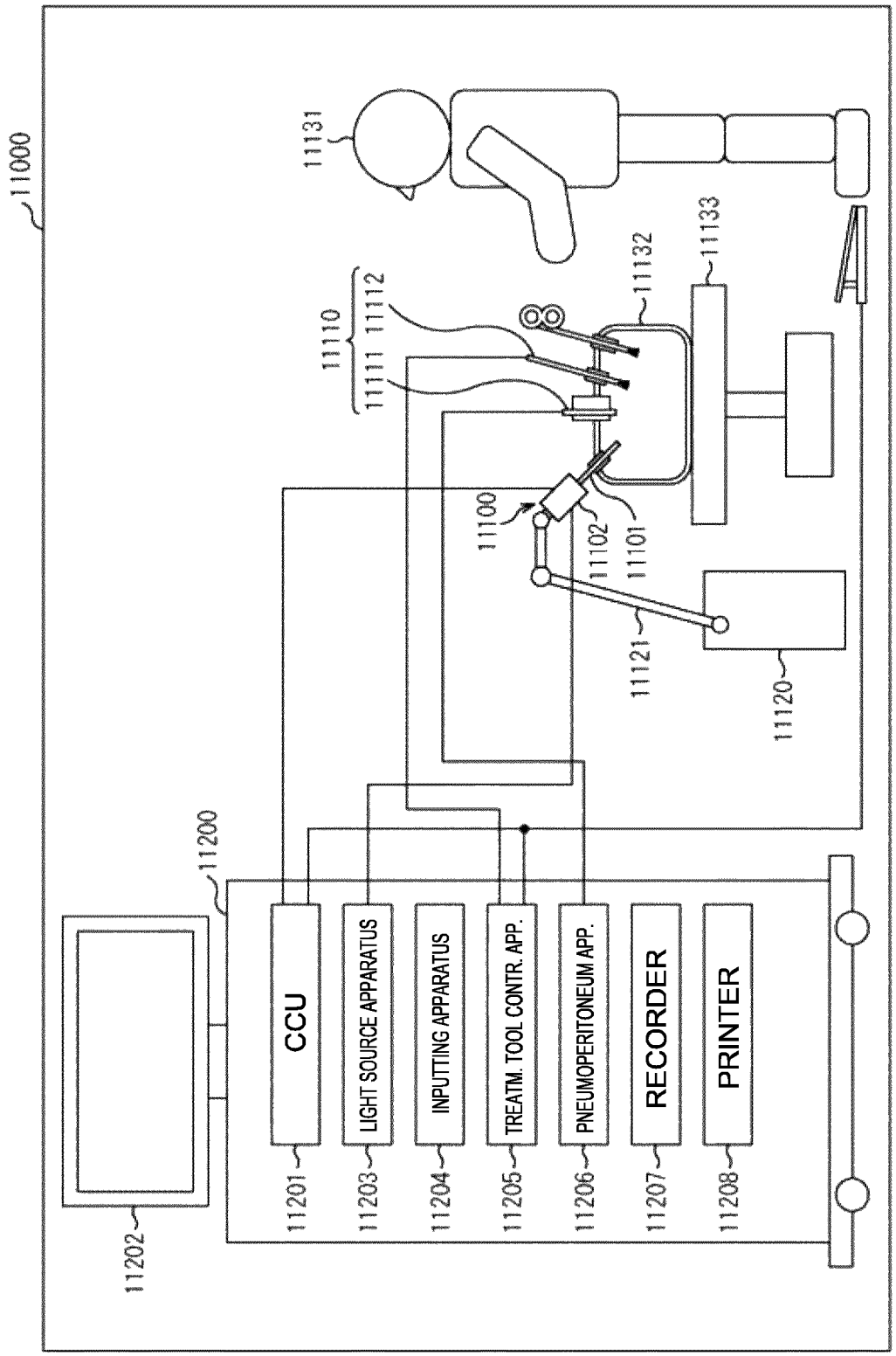
FIG. 13 is a block diagram depicting an example of a schematic configuration of an endoscopic surgery system according to the present disclosure.

FIG. 13 is a view depicting an example of a schematic configuration of an endoscopic surgery system to which the technology according to an embodiment of the present disclosure (present technology) can be applied.

In FIG. 13, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element (solid-state imaging device) are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

The example of the endoscopic surgery system to which the technology according to an embodiment of the present disclosure is applied has been described above.

The technology according to the present disclosure may also be realized as a light receiving device mounted in a mobile body of any type such as automobile, electric vehicle, hybrid electric vehicle, motorcycle, bicycle, personal mobility, airplane, drone, ship, or robot.

Figure 14:
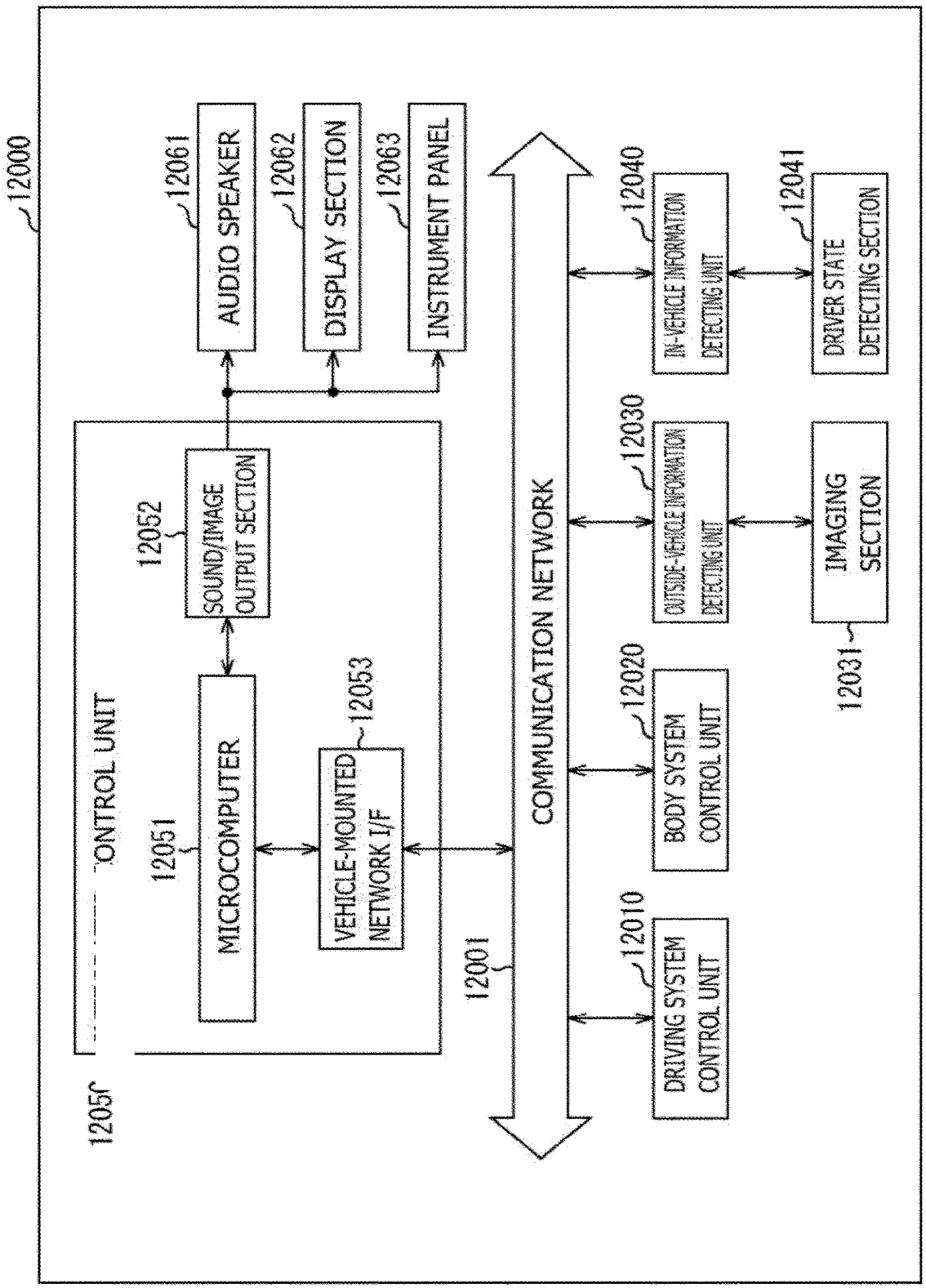
FIG. 14 is a block diagram depicting an example of a schematic configuration of a vehicle control system.

FIG. 14 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 14, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 imaging an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 may be or may include a solid-state imaging device with a raw driver assembly according to the embodiments of the present disclosure. The light received by the imaging section 12031 may be visible light, or may be invisible light such as infrared rays or the like.

The in-vehicle information detecting unit 12040 detects information about the inside of the vehicle and may be or may include a solid-state imaging device with a raw driver assembly according to the embodiments of the present disclosure. The in-vehicle information detecting unit 12040 is, for example, connected with a driver state detecting section 12041 that detects the state of a driver. The driver state detecting section 12041, for example, includes a camera that includes the solid-state imaging device and that is focused on the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or audible notifying information to an occupant of the vehicle or the outside of the vehicle. In the example of FIG. 14, an audio speaker 12061, a display section 12062, and an instrument panel 12063 are illustrated as the output device. The display section 12062 may, for example, include at least one of an on-board display or a head-up display, wherein each of them may include a solid-state imaging device using a latch comparator circuit for event detection.

Figure 15:
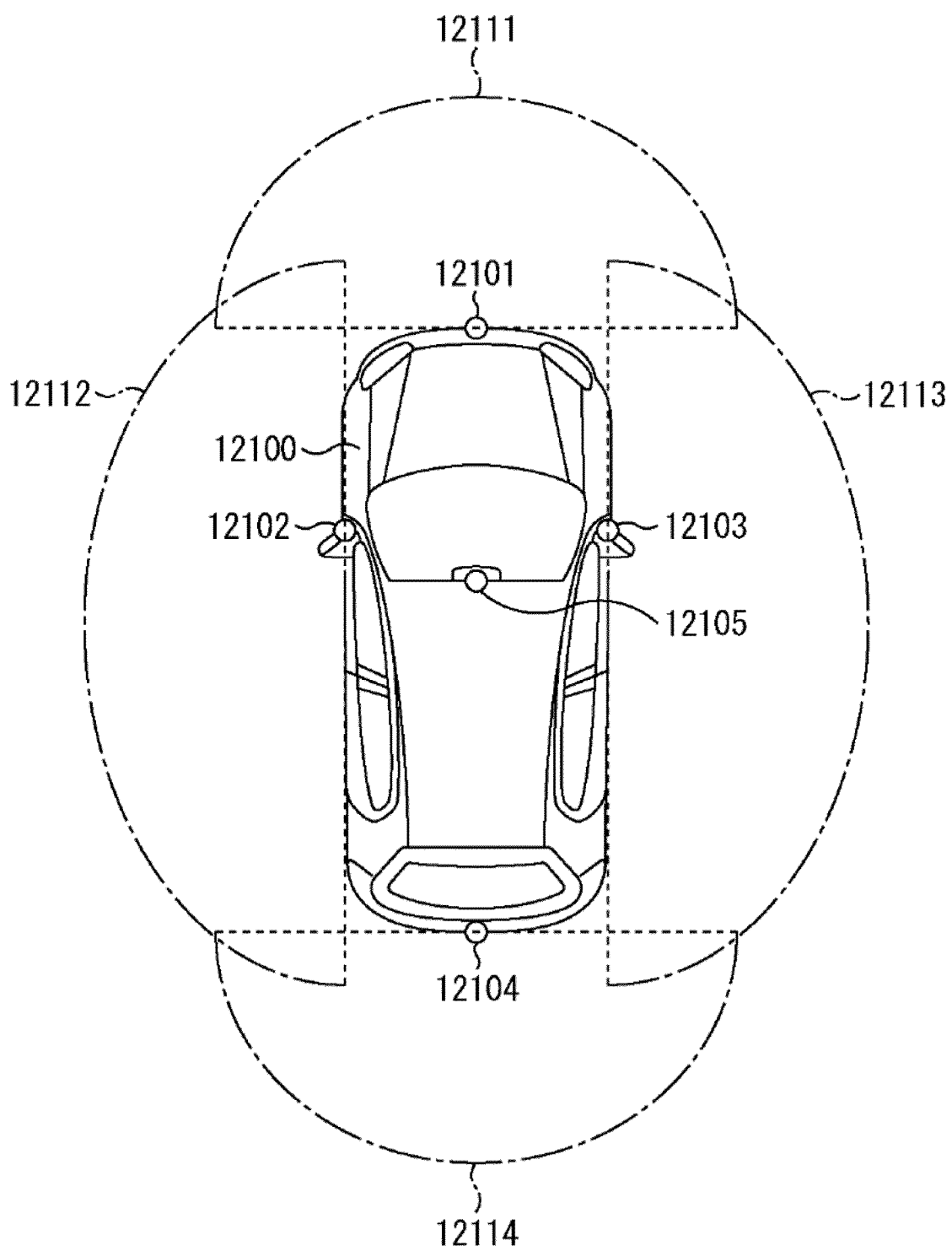
FIG. 15 is a diagram of assistance in explaining an example of installation positions of an outside-vehicle information detecting section and an imaging section of the vehicle control system of FIG. 14.

FIG. 15 is a diagram depicting an example of the installation position of the imaging section 12031, wherein imaging section 12031 may include imaging sections 12101, 12102, 12103, 12104, and 12105.

The imaging sections 12101, 12102, 12103, 12104, and 12105 are, for example, disposed at positions on a front nose, side-view mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the side view mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 15 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the side view mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, imaging element having pixels for phase difference detection or may include a ToF module including a solid-state imaging device according to the present disclosure.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to an embodiment of the present disclosure is applicable has been described above. By applying solid-state imaging devices with a raw driver assembly including an error detection circuit according to the embodiments, the assessment of the captured images can consider information about possibly defect pixels. For example, recognition of pedestrians can be performed on more reliable pixel information.

Additionally, embodiments of the present technology are not limited to the above-described embodiments, but various changes can be made within the scope of the present technology without departing from the gist of the present technology.

The solid-state imaging device with latch comparator circuits according to the present disclosure may be any device used for analyzing and/or processing radiation such as visible light, infrared light, ultraviolet light, and X-rays. For example, the solid-state imaging device may be any electronic device in the field of traffic, the field of home appliances, the field of medical and healthcare, the field of security, the field of beauty, the field of sports, the field of agriculture, the field of image reproduction or the like.

Specifically, in the field of image reproduction, the solid-state imaging device may be a device for capturing an image to be provided for appreciation, such as a digital camera, a smart phone, or a mobile phone device having a camera function. In the field of traffic, for example, the solid-state imaging device may be integrated in an in-vehicle sensor that captures the front, rear, peripheries, an interior of the vehicle, etc. for safe driving such as automatic stop, recognition of a state of a driver, or the like, in a monitoring camera that monitors traveling vehicles and roads, or in a distance measuring sensor that measures a distance between vehicles or the like.

In the field of home appliances, the solid-state imaging device may be integrated in any type of sensor that can be used in devices provided for home appliances such as TV receivers, refrigerators, and air conditioners to capture gestures of users and perform device operations according to the gestures. Accordingly the solid-state imaging device may be integrated in home appliances such as TV receivers, refrigerators, and air conditioners and/or in devices controlling the home appliances. Furthermore, in the field of medical and healthcare, the solid-state imaging device may be integrated in any type of sensor, e.g. a solid-state image device, provided for use in medical and healthcare, such as an endoscope or a device that performs angiography by receiving infrared light.

In the field of security, the solid-state imaging device can be integrated in a device provided for use in security, such as a monitoring camera for crime prevention or a camera for person authentication use. Furthermore, in the field of beauty, the solid-state imaging device can be used in a device provided for use in beauty, such as a skin measuring instrument that captures skin or a microscope that captures a probe. In the field of sports, the solid-state imaging device can be integrated in a device provided for use in sports, such as an action camera or a wearable camera for sport use or the like. Furthermore, in the field of agriculture, the solid-state imaging device can be used in a device provided for use in agriculture, such as a camera for monitoring the condition of fields and crops.

Note that the present technology can also be configured as described below:

(1) A row driver assembly, including:
a row driver unit including a buffer circuit configured to drive a buffered control signal to a pixel circuit, wherein the buffer circuit is electrically connected to a high buffer supply voltage and to a low buffer supply voltage; a voltage converter circuit configured to supply the low buffer supply voltage to the buffer circuit; and an error detection circuit configured to output an active error signal when the low buffer supply voltage is outside a target voltage window.

(2) The row driver assembly according to (1), wherein the voltage converter circuit includes an amplifier circuit with an inverting input and a non-inverting input and a charge pump circuit, wherein the charge pump circuit is configured to obtain the low buffer supply voltage from a high supply voltage, a low supply voltage and an output voltage of the amplifier circuit, and wherein the low buffer supply voltage is fed back to the inverting input of the amplifier circuit through a feedback network.

(3) The row driver assembly according to (2), wherein the charge pump circuit includes a charge pump capacitor and transistor switches electrically connected to the charge pump capacitor, and wherein the charge pump circuit is configured to obtain the low buffer supply voltage by alternatingly connecting the charge pump capacitor to an output of the amplifier circuit, to the high supply voltage, to the low supply voltage and to a charge pump output node.

(4) The row driver assembly according to (2), wherein the inverting input of the amplifier circuit and an input of the error detection circuit are electrically connected.

(5) The row driver assembly according to (1), wherein the error detection circuit includes a comparator circuit with a first threshold input electrically connected to a high threshold voltage and with a second threshold input electrically connected to a low threshold voltage, and wherein the comparator circuit is configured to output an active error signal when a signal at the input of the error detection circuit is higher than the high threshold voltage or lower than the low threshold voltage.

(6) The row driver assembly according to (5), wherein the comparator circuit includes input circuits including transistors configured to operate at weak or moderate inversion, current source circuits including transistors configured to operate at strong inversion, and current mirror circuits including transistors configured to operate at strong inversion.

(7) The row driver assembly according to (5), further including:
a resistor ladder including a plurality of unit resistors electrically arranged in series between a regulated voltage and a voltage reference potential,
wherein the error detection circuit is configured to obtain the high threshold voltage and the low threshold voltage from tapping nodes of the resistor ladder between electrically neighboring unit resistors.

(8) The row driver assembly according to (7), further including:
a first multiplexer, wherein inputs of the first multiplexer are connected to different tapping nodes of the resistor ladder and an output of the first multiplexer is connected to the first threshold input of the comparator circuit, and a second multiplexer, wherein inputs of the second multiplexer are connected to different tapping nodes of the resistor ladder and an output of the second multiplexer is connected to the second threshold input of the comparator circuit.

(9) The row driver assembly according to (5), further including:
a resistor ladder including a plurality of unit resistors electrically arranged in series, and a tunable current source circuit configured to impress a tunable current through the resistor ladder, wherein the error detection circuit is configured to obtain the high threshold voltage and the low threshold voltage from tapping nodes of the resistor ladder between electrically neighboring unit resistors.

(10) The row driver assembly according to (9), wherein the tunable current source circuit includes a current mirror with a current-to-voltage converter stage and a switchable voltage-to-current converter stage.

(11) The row driver assembly according to (10), wherein the switchable voltage-to-current converter stage includes a plurality of converter paths electrically connected in parallel between a supply voltage and a first unit resistor of the resistor ladder, and wherein each converter path includes a voltage-to-current converter transistor and a transistor switch electrically connected in series.

(12) The row driver assembly according to (11), wherein the row driver unit includes a plurality of voltage converter circuits configured to supply different low buffer supply voltages and wherein the row driver unit includes a an error detection circuit for each of the voltage converter circuits.

(13) A solid-state imaging device, including:
a pixel circuit including a photoelectric conversion element and at least one pixel transistor;
a row driver unit including a buffer circuit configured to drive a gate signal for the at least one pixel transistor, wherein the buffer circuit is electrically connected to a high buffer supply voltage and to a low buffer supply voltage;
a voltage converter circuit configured to supply the low buffer supply voltage to the buffer circuit; and an error detection circuit configured to output an active error signal when the low buffer supply voltage is outside a target voltage window.

(14) The solid-state imaging device according (13), wherein the row driver unit includes a plurality of voltage converter circuits configured to supply different low buffer supply voltages and wherein the row driver unit includes a an error detection circuit for each of the voltage converter circuits.

The invention claimed is:
1. A row driver assembly, comprising:
a row driver comprising a buffer circuit configured to drive a buffered control signal to a pixel circuit, wherein the buffer circuit is electrically connected to a high buffer supply voltage and to a low buffer supply voltage;
a voltage converter circuit configured to supply the low buffer supply voltage to the buffer circuit; and
an error detection circuit configured to output an active error signal when the low buffer supply voltage is outside a target voltage window,
wherein the voltage converter circuit comprises an amplifier circuit with an inverting input and a non-inverting input and a charge pump circuit,
wherein the charge pump circuit is configured to obtain the low buffer supply voltage from a high supply voltage, a low supply voltage and an output voltage of the amplifier circuit, and
wherein the low buffer supply voltage is fed back to the inverting input of the amplifier circuit through a feedback network.

2. The row driver assembly according to claim 1, wherein the charge pump circuit comprises a charge pump capacitor and transistor switches electrically connected to the charge pump capacitor, and wherein the charge pump circuit is configured to obtain the low buffer supply voltage by alternatingly connecting the charge pump capacitor to an output of the amplifier circuit, to the high supply voltage, to the low supply voltage and to a charge pump output node.

3. The row driver assembly according to claim 1, wherein the inverting input of the amplifier circuit and an input of the error detection circuit are electrically connected.

4. The row driver assembly according to claim 1, wherein the error detection circuit comprises a comparator circuit with a first threshold input electrically connected to a high threshold voltage and with a second threshold input electrically connected to a low threshold voltage, and
wherein the comparator circuit is configured to output an active error signal when a signal at the input of the error detection circuit is higher than the high threshold voltage or lower than the low threshold voltage.

5. A row driver assembly, comprising:
a row driver comprising a buffer circuit configured to drive a buffered control signal to a pixel circuit, wherein the buffer circuit is electrically connected to a high buffer supply voltage and to a low buffer supply voltage;
a voltage converter circuit configured to supply the low buffer supply voltage to the buffer circuit; and
an error detection circuit configured to output an active error signal when the low buffer supply voltage is outside a target voltage window,
wherein the error detection circuit comprises a comparator circuit with a first threshold input electrically connected to a high threshold voltage and with a second threshold input electrically connected to a low threshold voltage,
wherein the comparator circuit is configured to output an active error signal when a signal at the input of the error detection circuit is higher than the high threshold voltage or lower than the low threshold voltage, and
wherein the comparator circuit comprises input circuits comprising transistors configured to operate at weak or moderate inversion, current source circuits comprising transistors configured to operate at strong inversion, and current mirror circuits comprising transistors configured to operate at strong inversion.

6. The row driver assembly according to claim 4, further comprising:
a resistor ladder comprising a plurality of unit resistors electrically arranged in series between a regulated voltage and a voltage reference potential,
wherein the error detection circuit is configured to obtain the high threshold voltage and the low threshold voltage from tapping nodes of the resistor ladder between electrically neighboring unit resistors.

7. The row driver assembly according to claim 6, further comprising:
a first multiplexer, wherein inputs of the first multiplexer are connected to different tapping nodes of the resistor ladder and an output of the first multiplexer is connected to the first threshold input of the comparator circuit, and
a second multiplexer, wherein inputs of the second multiplexer are connected to different tapping nodes of the resistor ladder and an output of the second multiplexer is connected to the second threshold input of the comparator circuit.

8. The row driver assembly according to claim 4, further comprising:
a resistor ladder comprising a plurality of unit resistors electrically arranged in series, and
a tunable current source circuit configured to impress a tunable current through the resistor ladder,
wherein the error detection circuit is configured to obtain the high threshold voltage and the low threshold voltage from tapping nodes of the resistor ladder between electrically neighboring unit resistors.

9. The row driver assembly according to claim 8, wherein the tunable current source circuit comprises a current mirror with a current-to- voltage converter stage and a switchable voltage-to-current converter stage.

10. The row driver assembly according to claim 9, wherein the switchable voltage-to-current converter stage comprises a plurality of converter paths electrically connected in parallel between a supply voltage and a first unit resistor of the resistor ladder, and wherein each converter path includes a voltage-to-current converter transistor and a transistor switch electrically connected in series.

11. The row driver assembly according to claim 1, wherein the row driver comprises a plurality of voltage converter circuits configured to supply different low buffer supply voltages and wherein the row driver comprises an error detection circuit for each of the voltage converter circuits.

12. A solid-state imaging device comprising:
a pixel circuit comprising a photoelectric conversion element and at least one pixel transistor;
a row driver comprising a buffer circuit configured to drive a gate signal for the at least one pixel transistor, wherein the buffer circuit is electrically connected to a high buffer supply voltage and to a low buffer supply voltage;
a voltage converter circuit configured to supply the low buffer supply voltage to the buffer circuit; and
an error detection circuit configured to output an active error signal when the low buffer supply voltage is outside a target voltage window, wherein
the row driver unit comprises a plurality of voltage converter circuits configured to supply different low buffer supply voltages and wherein the row driver unit comprises an error detection circuit for each of the voltage converter circuits.

* * * * *